US009600791B2

(12) United States Patent
Talwar et al.

(10) Patent No.: US 9,600,791 B2
(45) Date of Patent: Mar. 21, 2017

(54) MANAGING A NETWORK SYSTEM

(75) Inventors: Vanish Talwar, Campbell, CA (US);
Susanta Adhikary, Karnataka (IN);
Jeffrey R. Hilland, Cedar Park, TX
(US); Kannan Vidhya, Bangalore (IN);
V Prashanth, Karnataka (IN); KS Sandeep, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1662 days.

(21) Appl. No.: 12/795,191

(22) Filed: Jun. 7, 2010

(65) Prior Publication Data

US 2011/0301998 A1    Dec. 8, 2011

(51) Int. Cl.
*G06F 15/173* (2006.01)
*G06Q 10/06* (2012.01)
*H04L 12/24* (2006.01)
*H04L 12/26* (2006.01)

(52) U.S. Cl.
CPC ....... *G06Q 10/06316* (2013.01); *H04L 12/24* (2013.01); *H04L 41/12* (2013.01); *H04L 43/08* (2013.01)

(58) Field of Classification Search
CPC ... G06Q 10/06316; H04L 12/24; H04L 41/12; H04L 43/08
USPC ........................................................ 709/223
See application file for complete search history.

(56) References Cited

U.S. PATENT DOCUMENTS

| 6,584,073 | B1* | 6/2003 | Steele et al. ................. 370/254 |
| 7,490,323 | B2 | 2/2009 | D'Alo et al. |
| 2003/0060216 | A1* | 3/2003 | Kamel et al. ................. 455/457 |
| 2007/0073883 | A1* | 3/2007 | Chafle et al. ................. 709/226 |
| 2007/0286071 | A1 | 12/2007 | Cormode et al. |
| 2008/0096503 | A1* | 4/2008 | Economy et al. ......... 455/187.1 |
| 2009/0083390 | A1* | 3/2009 | Abu-Ghazaleh et al. .... 709/209 |
| 2009/0327458 | A1 | 12/2009 | Liu et al. |
| 2010/0131620 | A1* | 5/2010 | Kondamuru et al. ........ 709/220 |

OTHER PUBLICATIONS

J.M. Ca¯nas et al., "Jde+: an Open-Source Schema-Based Framework for Robotic Applications", Robotics Group, Universidad Rey Juan Carlos, 2007.
Alberto Gonzalez Prieto et al., "Adaptive Real-time Monitoring for Large-scale Networked Systems," Jun. 1, 2009.
Mei Yiduo et al., Rapid and Automated Deployment of Monitoring Services in Grid Environments (Research Paper), Publication Date: 2007, pp. 328-335.

* cited by examiner

*Primary Examiner* — June Sison
*Assistant Examiner* — Steven Nguyen
(74) *Attorney, Agent, or Firm* — Mannava & Kang, P.C.

(57) ABSTRACT

Managing a network system includes determining metrics for a plurality of nodes in the network system, determining a plurality of zones including the plurality of nodes based on the metrics for the network system, and, for each zone of the plurality of zones, determining a computational architecture to be implemented for the zone based on the metrics for each node of the plurality of nodes in the zone.

17 Claims, 6 Drawing Sheets

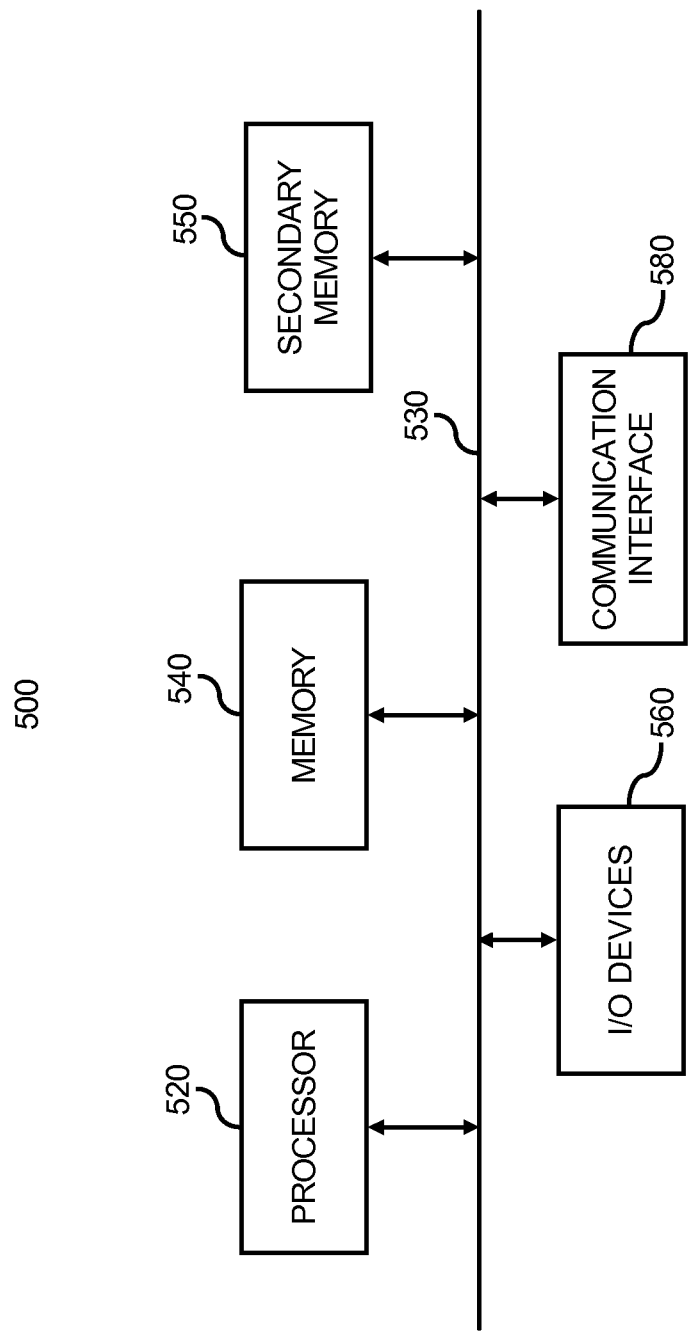

MANAGING A NETWORK SYSTEM

BACKGROUND

To manage large-scale data centers and utility clouds, continuous monitoring along with analysis of the data captured by the monitoring are often performed. Monitoring constitutes a critical component of a closed-loop automation solution in data centers. Next generation data centers such as for emerging cloud infrastructures are expected to be characterized by large scale, complexity, and dynamism. Increased core counts, increased blade densities, and virtualization would result in numbers of end systems and a degree of heterogeneity that would substantially benefit from an automated and online monitoring and management system with minimal administrator intervention. However, performing continuous and on-demand monitoring to detect, correlate, and analyze data for a fast reaction to system issues is difficult, especially when a huge volume of monitoring data is produced across multiple management domains and nodes.

Most current monitoring approaches are centralized, ad-hoc, and siloed, leading to scalability, visibility, and accuracy limitations. Typically, analysis of monitoring data is done offline resulting in hindrance to automated solutions. Distributed monitoring and aggregation systems have been proposed. However, they impose high overhead due to use of expensive peer-to-peer mechanisms not optimized for management needs in data centers. In addition, distributed monitoring systems such as Ganglia are popular, however, they use a static hierarchy, having limited support for advanced analysis functions and runtime changes to monitoring hierarchy. The scalability, visibility, and accuracy limitations of the existing centralized, ad-hoc, and siloed approaches to monitoring may translate to high costs and unsatisfied service level agreements (SLAs).

BRIEF DESCRIPTION OF DRAWINGS

The embodiments of the invention will be described in detail in the following description with reference to the following figures.

FIG. 5 shows a block diagram of a computer system configured to implement or execute one or more of the processes depicted in FIG. 4, according to an embodiment of the present invention.

DETAILED DESCRIPTION OF EMBODIMENTS

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

According to an embodiment, a computation-communication graph and a computational architecture combining monitoring and scalable analysis for managing a network system is provided. The network system may include a data center. The computational architecture may be a scalable computational architecture. The computational architecture may be a software architecture. The scalable computational architecture combines monitoring and analysis in a network system. The computation-communication graph and the computational architecture may be run as an online service in large-scale network system, such as large-scale data centers or utility clouds. In an embodiment, the computational architecture performs monitoring and analysis functions through a computation-communication graph distributed across nodes of a network system. A node may be a client or an access point (AP) in a network. A node may be a device, such as a switch or a server in a network.

In an embodiment, a method for managing a network system improves scalability through the use of a distributed computation-communication graph for performing monitoring and management functions, and reduces time to detect an anomalous network behavior, such as experiencing a delay above a threshold. In an embodiment, a method for managing a network system may apply management policies for analysis and/or anomaly detection close to a source of monitoring data. In addition, the method may satisfy service level agreements (SLAs) on data aggregation and analysis completion times, such as an upper bound on those times, irrespective of a scale in the network system.

Figure 1:
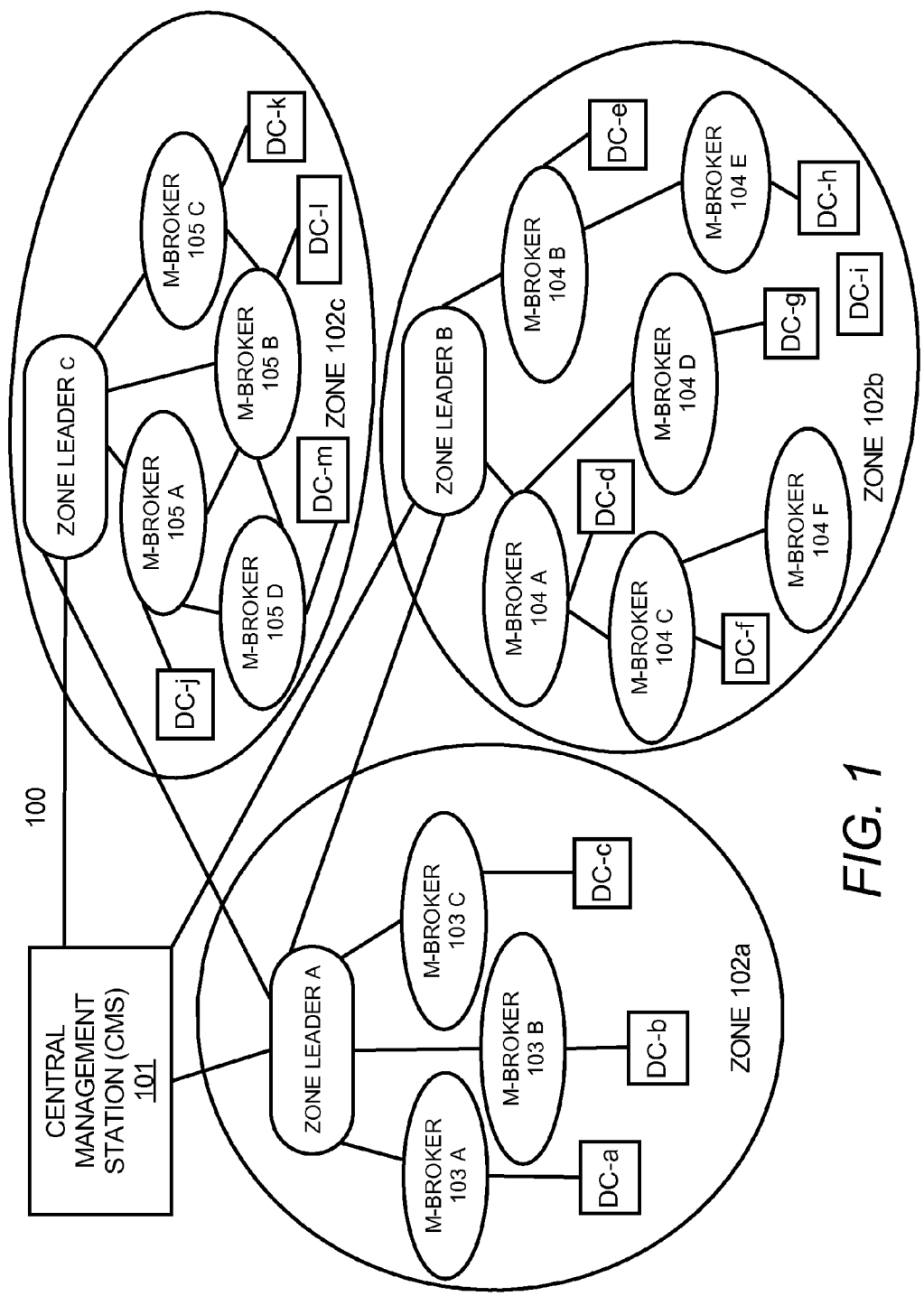
FIG. 1 illustrates a network system, according to an embodiment of the present invention.

FIG. 1 illustrates a block diagram of a system 100 for managing a network system including different zones, according to an embodiment of the present invention.

The system 100 includes a central management station (CMS) 101, a plurality of zones, a zone 102a, a zone 102b, and a zone 102c. In one embodiment, the central management station 101 may manage the plurality of zones, the zones 102a-c in the network system. A zone may be a logical collection of machines. For example, in a hardware-centric view, a zone may be a physically co-located set of racks. In a further example, a zone may include a physical subsystem, such as a set of racks on a single network switch in a data center, and front end and back end machines, as shown in FIG. 3. In a service-centric view, a zone may be a collection of machines spanning multiple racks running a service, or a zone may be determined based on a set of servers in a cloud running a customer's application. In one embodiment, applications, such as web applications, running on virtual machines may span multiple zones. For example, request schedulers of web applications may run on a data center's frontend machines and database servers may run on the data center's backend machines in a different zone. A zone may be a vehicle for delineating data center subsystems or the multiple physical data centers located in a single public/private cloud.

Each of the zones 102a-c includes a zone leader. For example, the zone 102a includes a zone leader A, the zone 102b includes a zone leader B, and the zone 102c includes a zone leader C. The central management station 101 may communicate with the zone leaders A-C. In addition, each of the zones 102a-c includes a plurality of monitoring brokers (m-brokers). For example, the zone 102a includes monitoring brokers 103A-C, the zone 102b includes monitoring brokers 104A-F, and the zone 102c includes monitoring brokers 105A-D. The CMS 101 may initially assign the monitoring brokers 103A-C, 104A-F, and 105A-D to the zones 102a-c, for example, using a planning algorithm.

The monitoring brokers may communicate with at least one data collector (DC) as shown in FIG. 1. For example, each of the monitoring brokers 103A-C is linked to each of data collectors DC-a-c, each of the monitoring brokers 104A-F is linked to each of data collectors DC-d-i, and each of the monitoring brokers 105A-D is linked to each of data collectors DC-j-m, respectively. In an embodiment, each of the monitoring brokers may aggregate data including metrics received from each of the data collectors. In another embodiment, the metrics are analyzed to detect anomalous behavior in the system. The metrics may be performance metrics. Examples of the metrics are a current state of the network system including a current load of the network system, latency, throughput, bandwidth, system utilization (such as CPU, memory), power consumption, and temperature readings. The monitoring brokers 103A-C, 104A-F, and 105A-D, the data collectors DC-a-m, and the zone leaders A-C are also nodes in the network system. In an embodiment, the monitoring brokers 103A-C, 104A-F, and 105A-D may communicates with other nodes in the zone via an identifier associated with each of the nodes in the network.

Different computational architectures may be implemented as shown in FIG. 1. Examples of different computational architectures include a single-hierarchy architecture, a multi-hierarchy architecture and a peer-to-peer architecture. For example, in FIG. 1, the zone 102a implements a single-hierarchy architecture, the zone 102b implements a multi-hierarchy architecture, and the zone 102c implements a peer-to-peer architecture. In the single-hierarchy architecture, each of the monitoring brokers 103A-C directly communicates with the zone leader A. In the multi-hierarchy architecture, each of the monitoring brokers 104C-F communicates with the zone leader B via the other monitoring brokers 104A-B through a hierarchical structure, such a tree structure or other structure with multiple levels in a hierarchy. In the peer-to-peer architecture, each of the monitoring brokers 105A-D may communicate with each other monitoring brokers in the same zone, the zone 102c. In addition, in the peer-to-peer architecture, each of the monitoring brokers 105A-D may communicate with the zone leader C directly or via the other monitoring brokers. In an embodiment, at least two of the zones of the zone 102a-c may implement a different computational architecture simultaneously.

The zone leaders A-C of the zones 102a-c may be determined by the monitoring brokers 103A-C, 104A-F, and 105A-D using a predetermined zone leader election process. An example of a zone leader election process is electing a zone leader based on a predetermined criteria, such as a highest IP address. Each of the zone leaders A-C of the zones 102a-c may communicate with other zone leaders. In an embodiment, each of the zone leaders A-C receives metrics from the monitoring brokers.

Figure 2:
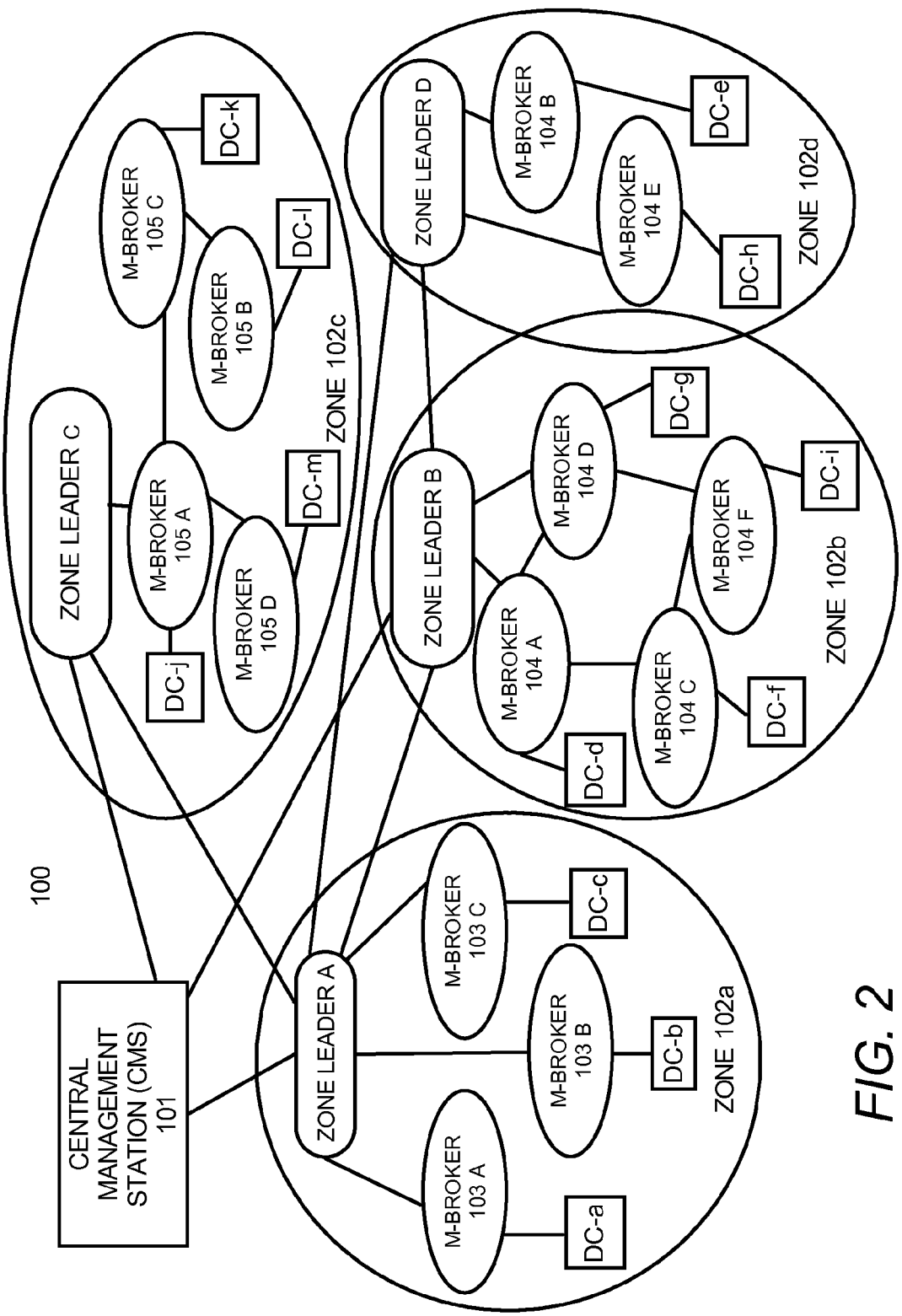
FIG. 2 illustrates the network system of FIG. 1 modified based on collected metrics, according to an embodiment of the present invention.

Further, a leader of the zone leaders A-C may be determined, for example by the zone leaders A-C. In one embodiment, the leader of zone leaders may report an event of the network to the central management station 101 based on a communication with the other zone leaders. In another embodiment, the leader of zone leaders receives metrics from the other zone leaders in other zones and further modifies the computational architecture for at least one of the zones based on the metrics. FIGS. 1 and 2 show that the leader of the zone leaders A-C is the zone leader A in this example.

In an embodiment, there are control actions that a zone leader can take. For example, if zone-level data aggregation completion time exceeds an acceptable threshold in the zone 102a, the zone leader A may trigger reconfiguration of the computation-communication graph within the zone 102a. The reconfiguration of the computation-communication graph within the zone 102a may change the computational architecture in the zone 102a, for example from the single-hierarchy architecture to a multi-hierarchy architecture, or to a peer-to-peer architecture, or a combination of both. When the data aggregation for a polling interval finally completes through a computational architecture, this triggers the execution of a management policy on the aggregated data. In an embodiment, a management policy may be applied on the aggregated data based on the newly collected metrics after modifying the computational architecture. An example of a management policy includes scheduling of a future analysis of an aggregated data or further inter-zone aggregation/analysis implementation. Other management policies include workload/VM migration and power regulation/capping policies.

In one embodiment, the central management station 101 may manage the plurality of zones, such as the zones 102a-c in the network system. In another embodiment, the leader of zone leaders may manage the plurality of zones, such as the zones 102a-c. In an embodiment, there are control actions that a leader of zone leaders can take across zones similar to the control actions a zone leader can take as described above. This takes place among zone-level leaders and reconfiguration of the computation-communication graph for multiple zones may take place across the leaders of the zones based on system load. For example, a computational architecture, such as the single-hierarchy architecture, the multi-hierarchy architecture and the peer-to-peer architecture, may be determined to be implemented among zone leaders of the plurality of zones and for the leader of the zone leaders. In one embodiment, a computational architecture may be determined to be implemented among the zone leaders of the plurality of zones based on the metrics for the zone leaders of the plurality of zones. The reconfiguration of the computation-communication graph across the plurality of zones may change the computational architecture across the plurality of zones, for example from the single-hierarchy architecture to a multi-hierarchy architecture, or to a peer-to-peer architecture, or a combination of both.

FIG. 2 illustrates the network system of FIG. 1 modified based on collected metrics, according to an embodiment of the present invention.

As shown in FIG. 2, the network system 100 is modified based on further collected metrics. In an embodiment, a boundary of some of the zones 102a-c may be modified based on periodically collected metrics or updated metrics. A boundary of a zone may indicate a size of the zone, or a size of physical subsystems, such as number of sets of racks on a single network switch in a data center. For example, a boundary of the zone 102b is changed based on further collected metrics. More particularly, depending on the load distribution of the system 100, the zone 102b may experience too much load at one point. When this happens, the boundary or the border of the zone 102b may be decreased so that the load in the zone 102b can be reduced. This may include distributing the current load of the system 100 evenly to have a balanced load for better managing of the system 100. In an embodiment, a change of the boundary of a zone may create a new zone, such as a zone 102d, and a new zone leader, such as a zone leader D.

In an embodiment, a computational architecture of some of the zones 102a-c may be changed based on further collected metrics. For example, the computational architecture of the zone 102b has been changed from the multi-hierarchy architecture to the peer-to-peer architecture. In addition, the computational architecture of the zone 102c has been changed from the peer-to-peer architecture to the multi-hierarchy architecture. This computational architecture change happens when the metrics are changed. For example, if the zone 102c experiences a delay while implementing a multi-hierarchy architecture, the zone 102c may instead implements a single-hierarchy architecture. By implementing the single-hierarchy architecture, every monitoring brokers and data collectors belongs to the zone 102c may have a single path to the zone leader C, and data collection and aggregation processes in the zone 102c do not have to go through the multiple monitoring brokers, and may avoid a delay.

Figure 3A:
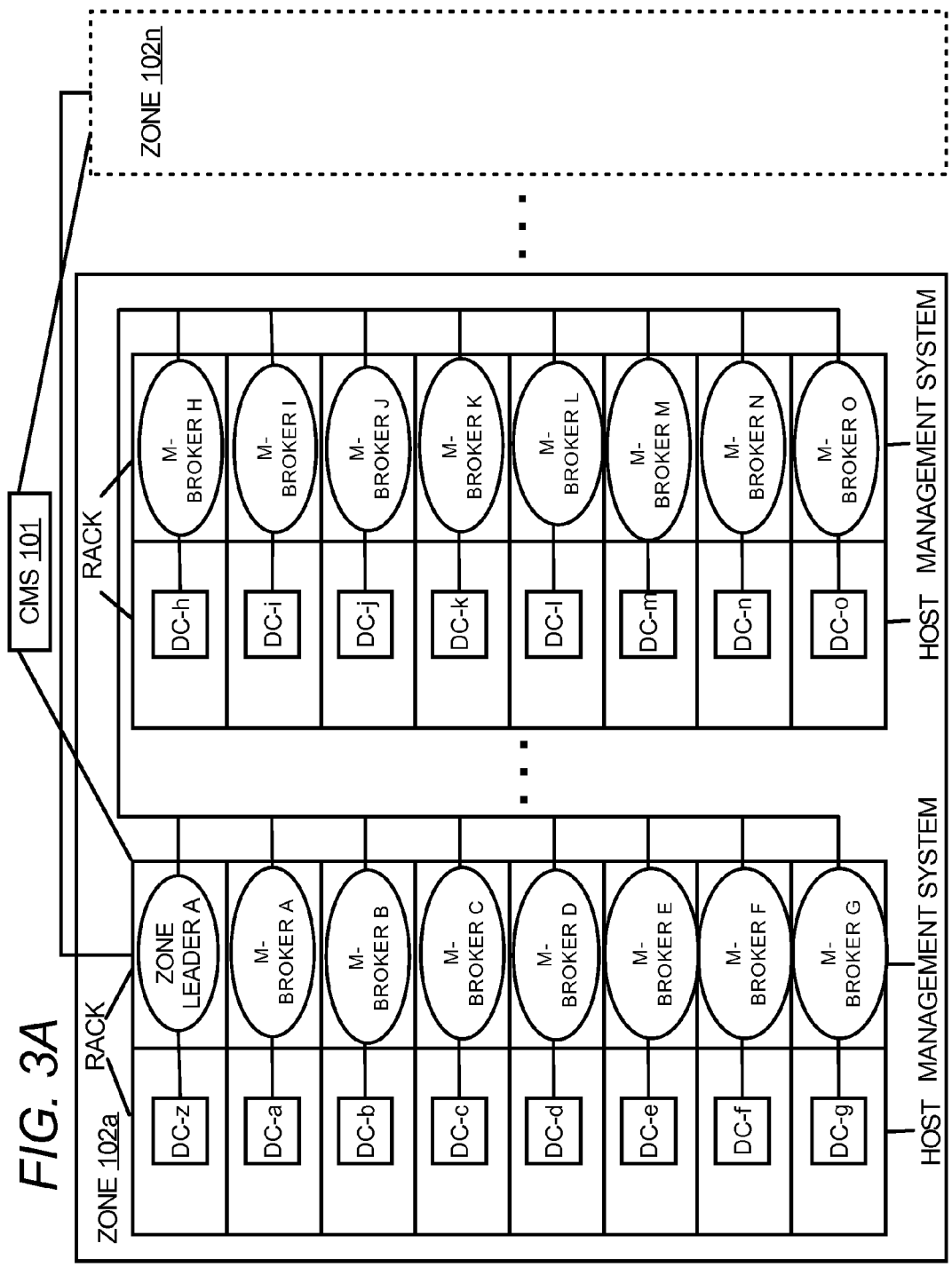
FIG. 3A illustrates a zone of the network system, according to an embodiment of the present invention.

FIG. 3A illustrates a zone of the network system, according to an embodiment of the present invention. In one embodiment, the central management station (CMS) 101 may manage the zones 102a through zone 102n. The zone 102a may be the same as the zone 102a shown in FIG. 1. Although the zone 102a illustrated in FIG. 3A looks slightly different from the zone 102a shown in FIG. 1, it should be apparent to those of ordinary skill in the art that the zone 102a and other elements described herein may be added or existing elements may be removed, modified or rearranged without departing from the scopes of the invention. Also, the zone 102a is described with respect to the system 100 by way of example and not limitation, and the zone 102a may be used in other systems.

Physically, a zone is a collection of nodes associated with a unique identifier communicated to the monitoring brokers on each node. The nodes in each zone of the plurality of zones may include one or more monitoring brokers and one or more data collectors. The zone 102a includes data collectors, DC-a through DC-o and DC-z. each of the data collectors, DC-a through DC-o and DC-z captures and locally processes desired data. The data collectors, DC-a through DC-o and DC-z may reside at multiple levels of abstraction in target systems, including at application level, system level, and hypervisor level. The data collectors, DC-a through DC-o and DC-z may also access hardware and physical sensors, such as hardware counters provided by computing platforms.

The zone 102a also includes the zone leader A and monitoring brokers A through O distributed throughout the network system, such as a data center. In an embodiment, the monitoring brokers A through O may be deployed in isolated management virtual machines or in management processors, such as HP's iLO, or in management blades such as HEWLETT-PACKARD's blades. The monitoring brokers A-O may perform correlation, aggregation, and analysis functions such as to detect anomalous behavior. Each of the monitoring brokers A-O aggregates and analyzes data collected by its corresponding data collectors. Each set of data collector/ monitoring broker is internally multiplexed to execute multiple logical structures represented as computation-communication graphs. Each set of data collector/monitoring broker represents specific captured data and the analysis methods applied to it. For example, as with multiple threads in a single process, the data collectors DC-a through DC-o and DC-z, and the monitoring brokers A-O internally maintain and operate multiple computation-communication graphs.

The monitoring brokers may execute in specialized virtual machines, such as management virtual machines, on dedicated hosts, such as manageability engines. In one embodiment, by separately providing the monitoring brokers A-O and the data collectors DC-a through DC-o and DC-z, latency and QoS guarantees can be made for monitoring and management of the network system, unaffected by current application actions and loads.

Figure 3B:
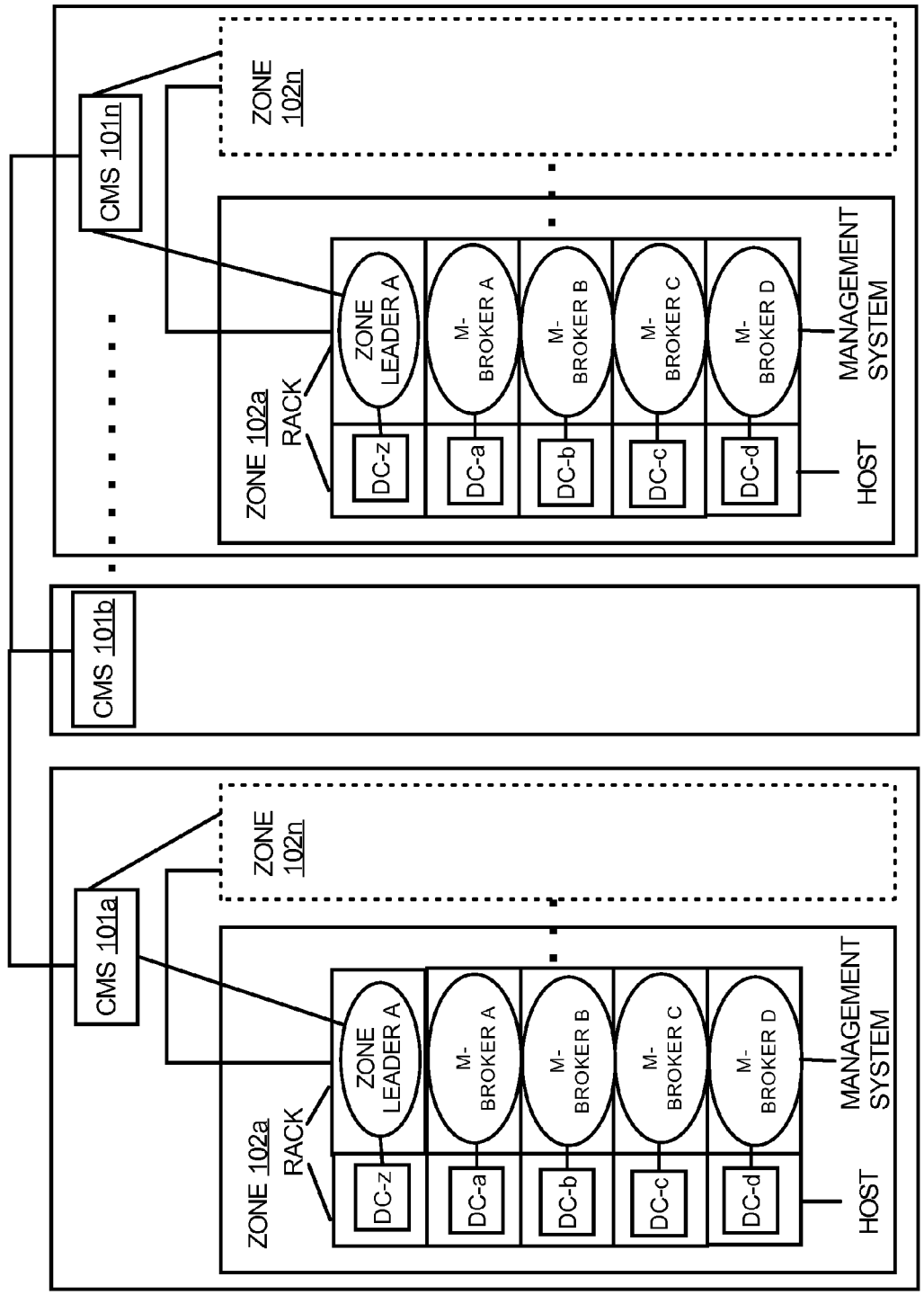
FIG. 3B illustrates an expansion of the network system of FIG. 3A, according to an embodiment of the present invention.

In an embodiment, a network system, such as the network system shown in FIG. 3A may be expanded to a collection of multiple network systems or to multiple data centers. FIG. 3B illustrates an expansion of the network system of FIG. 3A, according to an embodiment of the present invention.

The CMS 101a of FIG. 3B may be the same as the CMS 101 shown in FIG. 3A. The zone 102a of the CMS 101a may be the same as the zone 102a shown in FIG. 3A. Although the zone 102a illustrated in FIG. 3B looks slightly different from the zone 102a shown in FIG. 3A, it should be apparent to those of ordinary skill in the art that the zone 102a and other elements described herein may be added or existing elements may be removed, modified or rearranged without departing from the scopes of the invention. Also, the zone 102a is described with respect to the system 100 by way of example and not limitation, and the zone 102a may be used in other systems.

In one embodiment, each of the central management stations, such as the CMS 101a through CMS 101n, may manage its own zones, such as the zone 102a through zone 102n. In another embodiment, the CMSs 101a-n may be managed as a group in a similar way as the zones 102a through zone 102n are managed by each of the CMS 101a through CMS 102n.

An embodiment of a method in which the system 100 may be employed for managing a network system will now be described with respect to the flow diagrams of the method 400 depicted in FIG. 4. It should be apparent to those of ordinary skill in the art that the method 400, and for other methods described herein that other steps may be added or existing steps may be removed, modified or rearranged without departing from the scopes of the method 400. Also, the methods are described with respect to the system 100 by way of example and not limitation, and the methods may be used in other systems.

Figure 4:
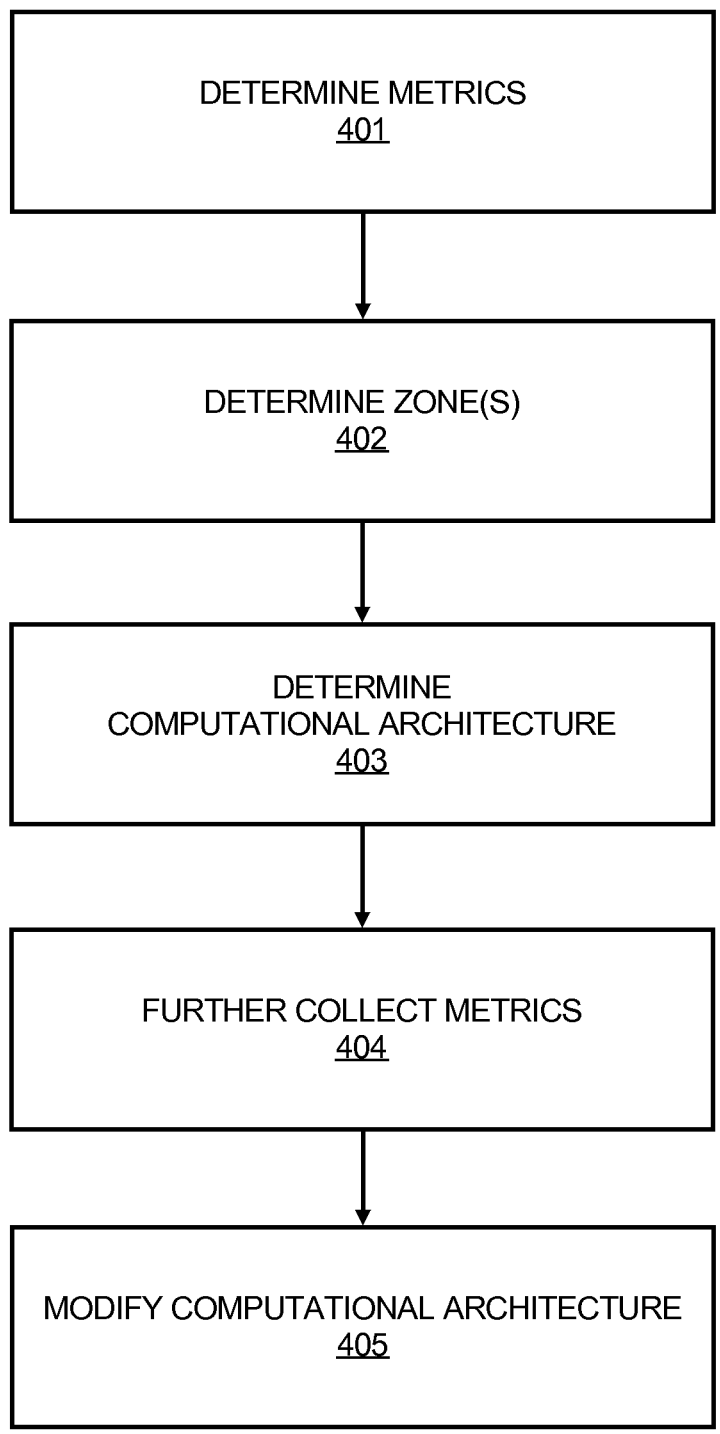
FIG. 4 illustrates a flow chart of a method for managing a network system, according to an embodiment of the present invention.

FIG. 4 illustrates a flowchart of a method 400 for managing a network system, according to an embodiment of the present invention.

At step 401, metrics for a plurality of nodes in the network system are determined. The metrics may be performance metrics. Examples of the metrics are a current state of the network system including a current load of the network system, latency, throughput, bandwidth, system utilization (such as CPU, memory), power consumption, and temperature readings.

At step 402, one or more zones are determined based on the metrics for the network system. As described herein above, the nodes in each zone of the plurality of zones may include one or more monitoring brokers and one or more data collectors. In one embodiment, one or more zones may be determined by assigning one or more monitoring brokers to one or more zones. One or more monitoring brokers may be assigned to one or more zones based on the current metrics for the network system. For example, if a zone is heavily loaded and needs to collect and analyze more data, the zone may include more monitoring brokers. Each one of the monitoring brokers receives the metrics from each of the data collectors. Each of the monitoring brokers communicates with other nodes in the zone via an identifier associated with each of the plurality of nodes. In an embodiment, each of the monitoring brokers aggregate the metrics, for example, in response to a request of the network system. The monitoring brokers may correlate each other and aggregate the metrics across multiple metrics, for example, in response to a request of the network system. In addition to this on-demand aggregation of the metrics, each of the monitoring brokers may analyze the aggregated metrics and determines an anomalous behavior of the network system based on the metrics. The monitoring brokers send the metrics to the zone leader in the zone. In an embodiment, the monitoring brokers may cooperate together in a distributed manner to perform the analysis of the aggregated metrics within a zone.

At step 403, for each zone of the plurality of zones, a computational architecture is determined. The computational architecture may be implemented for each zone based on the metrics for each node in each zone. For example, if a zone is lightly loaded and does not need to collect and analyze heavy data, the zone may implement a single-hierarchy architecture. If a zone is less tolerable to a delay, the zone may implement a peer-to-peer architecture so that the communication between the zone leader and monitoring brokers may have more route selection. At least some of the zones of the plurality of zones may implement different computational architectures, such as a single-hierarchy architecture, a multi-hierarchy architecture and a peer-to-peer architecture, simultaneously. For example, in FIG. 1, the zone 102a may implement the single-hierarchy architecture, the zone 102b may implement the multi-hierarchy architecture, and the zone 102c may implement the peer-to-peer architecture at the same time. In this step, a computation-communication graph may be constructed based on the plurality of zones determined at step 402 and the computational architectures for the zones. The network system may be managed based on the computation-communication graph. For example, the computational communication graphs may perform the distributed monitoring functions in the network system. The computation-communication graph is elastic and reconfigurable based on metrics, such as a current load in the network system. The zone leaders A-C may deploy and configure the computation-communication graphs across sets of the monitoring brokers and supervise their execution.

At step 404, the metrics are further collected after implementing different computational architectures for the plurality of zones. Here, the newly collected metrics may be sent to the zone leaders and to the leader of the zone leaders of the plurality of zones.

At step 405, the computational architectures for the plurality of zones are modified based on the further collected metrics for at least some of the zones of the plurality of zones. In one embodiment, a boundary of some of the zones of the plurality of zones may be modified based on the further collected metrics.

Some or all of the operations set forth in the figures may be contained as a utility, program, or subprogram, in any desired computer readable storage medium and executed by a processor on a computer system. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media that may be used to store the software and may include Random Access Memory (RAM), Read Only Memory (ROM), Electrically Programmable Read Only Memory (EPROM), Electrically Erasable Programmable Read Only Memory (EEPROM), hard disks, or other data storage devices.

FIG. 5 illustrates a block diagram of a computing apparatus 500 configured to implement or execute one or more of the processes depicted in FIG. 4, according to an embodiment. It should be understood that the illustration of the computing apparatus 500 is a generalized illustration and that the computing apparatus 500 may include additional components and that some of the components described may be removed and/or modified without departing from a scope of the computing apparatus 500.

The computing apparatus 500 includes a processor 520 that may implement or execute some or all of the steps described in one or more of the processes depicted in FIG. 4. The computing apparatus 500 also includes a main memory 540, such as a Random Access Memory (RAM), where software may reside during runtime, and a secondary memory 550. The secondary memory 550 may include, for example, a nonvolatile memory or other type of non-volatile data storage where a copy of the program code for one or more of the processes depicted in FIG. 4 may be stored. For example, the processor 520 is configured to implement one or more programs stored in the memory 540 to determine metrics for a plurality of nodes in the network system, to determine a plurality of zones including the plurality of nodes based on the metrics for the network system, and to determine a computational architecture to be implemented for the zone based on the metrics for each node of the plurality of nodes in the zone. Commands and data from the processor 520 are communicated over a communication bus 530.

The computer system 500 includes I/O devices 560. The I/O devices 560 may include a display and/or user interfaces comprising one or more I/O devices, such as a keyboard, a mouse, a stylus, speaker, and the like. A communication interface 580 is provided for communicating with other components. The communication interface 580 may be a wireless interface. The communication interface 580 may be a network interface.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for managing a network system, the method comprising:
    collecting, by a processor, metrics for a plurality of nodes in the network system;
    determining, by the processor, a plurality of zones including the plurality of nodes based on the metrics for the network system; and for each zone of the plurality of zones, determining a computational architecture to be implemented for the zone based on the metrics for each node of the plurality of nodes in the zone,
wherein the computational architecture to be implemented for each zone comprises one of a single-hierarchy architecture, a multi-hierarchy architecture, and a peer-to-peer architecture, and
wherein at least some of the zones of the plurality of zones implement different computational architectures simultaneously.

2. The method of claim 1, further comprising:
continuing to collect the metrics after implementing the computational architecture for each of the plurality of zones; and
modifying the computational architecture for at least one of the plurality of zones based on the continued collected metrics for the at least one of the plurality of zones.

3. The method of claim 2, further comprising:
modifying a boundary of at least one of the plurality of zones based on the continued collected metrics.

4. The method of claim 2, further comprising:
applying a management policy based on the continued collected metrics after modifying the computational architecture.

5. The method of claim 1, further comprising:
constructing a computation-communication graph including the plurality of zones; and
managing the network system based on the computation-communication graph.

6. The method of claim 1, wherein the nodes in each one of the plurality of zones include a plurality of monitoring brokers and a plurality of data collectors, and wherein each of the plurality of monitoring brokers receives the metrics from each of the plurality of data collectors.

7. The method of claim 6, wherein each of the plurality of monitoring brokers communicates with other nodes in the zone via an identifier associated with each of the plurality of nodes, and wherein the plurality of monitoring brokers are included in the computational architecture for each zone of the plurality of zones.

8. The method of claim 7, further comprising:
determining a zone leader of each zone of the plurality of zones based on a predetermined zone leader election process, wherein the zone leader of each zone of the plurality of zones communicates with other zone leaders.

9. The method of claim 8, further comprising:
determining a leader of zone leaders of the plurality of zones, wherein the leader of zone leaders communicates with other zone leaders of the plurality of zones.

10. The method of claim 9, further comprising:
for the plurality of zones, determining the computational architecture to be implemented for the zone leaders of the plurality of zones based on the metrics for the zone leaders of the plurality of zones.

11. The method of claim 9, further comprising:
sending the metrics to the leader of the zone leaders of the plurality of zones; and
modifying the computational architecture for at least one of the plurality of zones based on the metrics.

12. The method of claim 6, further comprising:
aggregating the metrics at each of the plurality of monitoring brokers in response to a request of the network system;
analyzing the metrics at each of the plurality of monitoring brokers, wherein each of the plurality of monitoring brokers communicates each other; and
determining an anomalous behavior of the network system based on the metrics.

13. The method of claim 12, further comprising:
sending the metrics from the plurality of monitoring brokers to the zone leader.

14. A computer system to manage a network system, the computer system comprising:
a processor in communication with a memory storing instructions that when executed cause the processor to:
collect metrics for a plurality of nodes in the network system;
determine a plurality of zones including the plurality of nodes based on the metrics for the network system; and
for each zone of the plurality of zones, determine a computational architecture to be implemented for the zone based on the metrics for each node of the plurality of nodes in the zone,
wherein the computational architecture to be implemented for each zone comprises one of a single-hierarchy architecture, a multi-hierarchy architecture, and a peer-to-peer architecture, and
wherein at least some of the zones of the plurality of zones implement different computational architectures simultaneously; and
a data storage device storing the metrics and information for the plurality of zones.

15. The computer system of claim 14, wherein the processor is to continue to collect the metrics after implementing the computational architecture for each of the plurality of zones, to modify the computational architecture for at least one of the plurality of zones based on the continued collected metrics for the at least one of the plurality of zones, and to modify a boundary of at least one of the plurality of zones based on the continued collected metrics.

16. The computer system of claim 15, wherein the nodes in each one of the plurality of zones include a plurality of monitoring brokers and a plurality of data collectors, and
wherein each of the plurality of monitoring brokers receives the metrics from each of the plurality of data collectors, and
wherein each of the plurality of monitoring brokers communicates with other nodes in the zone via an identifier associated with each of the plurality of nodes, and
wherein the plurality of monitoring brokers are included in the computational architecture for each zone of the plurality of zones, and
wherein the processor is configured to determine a zone leader of each zone of the plurality of zones based on a predetermined zone leader election process, to analyze the metrics at each of the plurality of monitoring brokers, to determine an anomalous behavior of the network system based on the metrics, and to send the metrics from the plurality of monitoring brokers to the zone leader, wherein the zone leader of each zone of the plurality of zones communicates with other zone leaders.

17. A non-transitory computer readable storage medium storing software that when executed by a processor performs a method for managing a network system, the method comprising:
collecting metrics for a plurality of nodes in the network system;

determining a plurality of zones including the plurality of nodes based on the metrics for the network system; and for each zone of the plurality of zones, determining a computational architecture to be implemented for the zone based on the metrics for each node of the plurality of nodes in the zone, wherein the computational architecture to be implemented for each zone comprises one of a single-hierarchy architecture, a multi-hierarchy architecture, and a peer-to-peer architecture, and wherein at least some of the zones of the plurality of zones implement different computational architectures simultaneously.

* * * * *